Patented Oct. 8, 1929

1,730,725

UNITED STATES PATENT OFFICE

PHILIP E. EDELMAN, OF CHICAGO, ILLINOIS, ASSIGNOR TO EPHRAIM BANNING, OF CHICAGO, ILLINOIS

POLARIZING ELECTROLYTE

No Drawing. Application filed March 19, 1928. Serial No. 263,003.

My present invention relates to electro-chemical devices in which an electro-positive metal such as aluminum or magnesium contacts with a chemical conductor, as for example in the case where two aluminum electrodes or an aluminum and a nickel electrode respectively are placed in an electrolyte to form a condenser. An object of the invention is to improve the efficiency of devices of this character in extending the range of permissible operation to much higher voltages and temperatures than have heretofore been attainable, and to prevent deterioration of the electrodes in service.

A common disadvantage of electrolytes heretofore used in the art arises from the breakdown voltage or voltage at which leakage begins to rapidly increase. For concentrated electrolytes this effect is accompanied by much heating and in some cases, arc sparking at the positive electrode. At the junction of the electrode between the portion exposed to the electrolyte and the portion remaining exposed to the atmosphere, such heating and arcing has been most noticed.

In experimenting to determine an improved electrolyte, I have found a suitable solution.

I am aware that my improvement has uses in electrolytic or electrochemical type condensers, rectifiers, lightning arresters, and other apparatus requiring an efficient rapid polarizing electrolyte in either liquid, semi-solid, or absorbed form. I am describing a suitable example of my conception, and various changes and modifications are permissible within the idea thereof and the scope of the appended claims.

I have discovered that a solution of a soluble higher polysaccharide provides the desired electrolyte. While various forms of carbohydrates may be used separately or in combination with other ingredients, a suitable example is ordinary gum arabic, said to have the formula $C_{12}H_{22}O_{11}$. This material is an amorphous water soluble gum obtained from trees of the acacia order and is a true gum affording a real clear solution. As modifications, the gum arabic may be adulterated with other compounds such as arabin, dextrin, inulin, arabinose, glucose or lactose, or small portions of sodium borate and boric acid, but the gum arabic of commerce serves very well by itself when simply dissolved in boiling hot distilled water. This group of organic compounds in general exhibits marked rotary effects on polarized light, that is to say, each has its own turning effect on the polarized light plane. Continuing with the example of gum arabic dissolved in water, suitable proportions of gum arabic to water are within the range from ½ ounce per pound of water up to the greatest amount of the gum arabic which can be made to dissolve by prolonged heating of the water, a suitable solution being attained when a clear thin syrup results. This gum arabic solution prepared in hot distilled water does not attack aluminum nor dissolve it as in the case of other known electrolyte materials, even when hot. Nor is a distinctly visible coating formed on the positive electrode when direct current is forced for a short time between two aluminum electrodes immersed in the gum arabic solution. The polarizing effect of the gum arabic electrolyte is very rapid. When two aluminum electrodes are immersed therein and connected to a source of direct current, a large current flows for a very brief time, diminishing rapidly down to a minute negligible value. Reversing the current applied again permits current to flow. In this case it appears that the polarizing effect occurs at the contact surface of the liquid or electrolyte, with possibly some arabinose, $C_5H_{10}O_5$ or arabin, $C_{10}H_{18}O_9$ transiently produced by the initial electrolysis.

Even when 220 volts is applied to unformed aluminum electrodes, no sparking is observed on the metal or at the junction air line where the metal leaves the electrolyte. The leakage current is extremely small, and the polarizing action occurs so rapidly that there is surprising improvement in the capacity-frequency ratio. By capacity-frequency ratio, is meant, the capacity of a condenser employing the polarized electrolyte to aluminum couple at a low alternating current frequency as compared to a high frequency, the capacity falling rapidly with increase of frequency.

In using the gum arabic solution, I prefer to use the least bulk thereof possible in order to reduce the distance between the electrodes.

It is permissible to add small portions of sodium borate and boric acid to thicken the syrup and increase the conductivity of the electrolyte.

The advantage of keeping the distance between electrodes exposed to the gum arabic solution small is that the resistance of such electrolyte material is relatively high. Thus the solution can be used as a liquid syrup or may be held absorbed by an absorbent material placed between the electrodes. If desired, an ordinary aluminum foil and paper condenser winding can be impregnated with this polarizing electrolyte and connected to a suitable source of current to form a high capacity condenser capable of withstanding much higher voltage than has heretofore been possible with condensers of this general type. For a rectifier, one will employ dissimilar electrodes as is customary in the art.

The electrolyte set forth by way of example affords surprising improvements in its class and readily penetrates absorbent paper suitable for condenser manufacture.

I claim:

1. A polarizing electrolyte material consisting of gum arabic prepared in water.

2. An electrolyte for polarizing purposes consisting of a higher polysaccharide amorphous material prepared in a syrup.

3. A polarizing electrolyte consisting of a solid gummy organic amorphous material prepared in a concentrated syrup.

4. A polarizing electrolyte consisting of a syrup of a soluble organic gum.

5. A polarizing syrup consisting of a gum dispersed in a suitable electrolyte.

In witness whereof, I have hereunto set my hand this 16th day of March, 1928.

PHILIP E. EDELMAN.